3,817,935
MANUFACTURE OF POLYBUTYLENE TEREPHTHALATES
Ludwig Beer, Ludwigshafen, Germany, assignor to Badische Anilin- & Soda-Fabrik Aktiengesellschaft, Ludwigshafen (Rhine), Germany
No Drawing. Filed Mar. 22, 1973, Ser. No. 343,814
Int. Cl. C08g 17/13, 17/15
U.S. Cl. 260—75 R        9 Claims

ABSTRACT OF THE DISCLOSURE

Manufacture of linear polyesters of polybutylene terephthalates containing at least 80% molar of butylene terephthalate units using specific catalysts consisting of titanium compounds produced from titanium dioxide, α-hydroxy carboxylic acids and tertiary amines. The polyesters are suitable for the manufacture of filaments, fibers, sheeting and injection molded articles.

---

This invention relates to a process for the manufacture of polybutylene terephthalates using titanium compounds as transesterification and polycondensation catalysts.

It is known to manufacture polybutylene terephthalates by reacting dialkyl terephthalates with butanediol-1,4. Industrial production of this polyester is generally carried out in two stages. In the first stage, dimethyl terephthalate, for example, is reacted with butanediol-1,4 with the liberation of methanol to give bis-hydroxybutyl terephthalate and its oligomeric condensation products. In the second stage, this transesterified product is condensed to high molecular weight polybutylene terephthalate at high temperatures and low pressures. This polymeric product is a valuable starting material for making fibers, sheeting and injection molded articles.

It is necessary to use catalysts to accelerate the transesterification and polycondensation reactions. Various catalysts have already been proposed for this purpose, for example zinc, antimony, lead and titanium catalysts. In German Published Appln. 1,420,515 esters and inorganic salts of titanic acid are proposed.

Esters of titanic acid suffer from the drawback that they are extremely susceptible to hydrolysis. This property has particularly undesirable results in the manufacture of polybutylene terephthalate, since relatively large quantities of tetrahydrofuran and water are produced in the transesterification and polycondensation stages involving the thermal cyclization of butanediol. The water thus continuously formed causes hydrolytic damage to the titanic ester, which eventually leads to titanium-containing deposits in the reactors and pipelines of the production plant and thus to serious disruptions of production. Furthermore, the conversion of the titanium catalyst originally dissolved in the reaction mixture into insoluble and thus catalytically inactive products leads to progressive reduction in the catalyst concentration and thus to a lowering of the reaction rate. However, it is particularly important to maintain an adequately high reaction rate in the manufacture of polybutylene terephthalates, since these products are heat-sensitive and should thus only be subjected to high reaction temperatures for a brief period.

Inorganic titanates, i.e. reaction products of titanium dioxide with inorganic bases, such as potassium titanate, suffer from the disadvantage that they are substantially insoluble in the reaction mixture and thus have low catalytic activity.

It is an object of the present invention to provide a simple process for the manufacture of polybutylene terephthalate involving the use of highly active catalytic titanium compound not suffering from the above drawbacks. These and other objects and advantages are achieved by the present invention.

The invention relates to a process for the manufacture of polybutylene terephthalates from dimethyl terephthalate and butane-diol-1,4 with or without the incorporation of up to 20% molar of other polyester-forming components, in the presence of a titanium compound acting as transesterification and polycondensation catalyst, wherein the titanium compounds used are such as are produced by the reaction of freshly precipitated titanium dioxide with α-hydroxy carboxylic acids of the general formula:

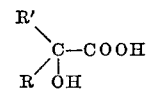

where R is —H, —CH₃, —CH₂OH, —CH₂COOH or —CHCOOH
                                                              |
                                                              CH and R' is —H or —CH₂COOH, and tertiary aliphatic amines in aqueous medium.

The titanium compounds used in the process of the invention are conveniently manufactured as follows:

A readily hydrolyzed titanium compound is added to an aqueous solution of an α-hydroxy carboxylic acid of the structure given above and a tertiary aliphatic amine with stirring or shaking. Reactive titanium dioxide hydrate is temporarily formed, this rapidly passing into solution. The reaction temperature is generally between the solidification and boiling points of the mixture, preferably temperatures of between 0° and 100° C. and in particular between 40° and 80° C. It may in some cases be advantageous to use higher temperatures at superatmospheric pressure.

On account of their ready availability, the most suitable readily hydrolyzed titanium compounds are titanium esters, for example those of aliphatic or cycloaliphatic alcohols of from 1 to 10 carbon atoms, e.g. tetramethyl, tetra-n-propyl, tetra-n-butyl, tetra-isobutyl, tetra-n-hexyl and tetracyclohexyl orthotitanates. When such esters are used, the resulting catalyst solutions are homogeneous when the alcohol component liberated during hydrolysis is soluble in the reaction mixture, i.e. in most cases in water.

It is advantageous when, as in the case of tetra-n-butyl orthotitanate (TBOT), a two-phase system is produced during hydrolysis on account of the alcohol eliminated, which system may be readily separated after being left to stand. One advantage of this is that the upper organic phase contains not only the major portion of the butanol but also colored impurities which are always present in commercially available tetra-n-butyl orthotitanate and which could lead to slight discoloration of the polyester material if the titanate were directly used as polyester catalyst. On the other hand, the butanol phase contains only traces of titanium compound, this showing that the tetra-n-butyl orthotitanate is virtually quantitatively saponified. The lower aqueous phase thus contains the major amount of titanium compound, presumably in the form of complex titanyl compounds of a salt-like structure. Thus the preparation of the titanium compounds used in the present invention from appropriate titanic acid esters effects additional purification, which improves the quality of the polyester.

Apart from titanic esters, other reaily hydrolyzed titanium compounds may be used, for example titanium tetrachloride and titanium tetraacylates. However, when these compounds are used, the risk of corrosion makes it advisable to neutralize the hydrochloric acid and carboxylic acid respectively eliminated during hydrolysis by the addition of equivalent amounts of an alkali metal hydroxide.

Suitable α-hydroxy carboxylic acids are those of the structure stated, for example glycolic acid, lactic acid, malic acid, tartaric acid and citric acid.

The most suitable tertiary aliphatic amines are those having straight-chain or branched-chain radicals of from 1 to 6 and preferably of from 1 to 4 carbon atoms. It will be appreciated that only those bases will be selected which do not form discolorations when decomposing at the polycondensation temperatures used. Examples of suitable amines are trimethylamine, triethylamine, tributylamine and tri-isobutylamine. Mixtures of bases may also be used.

The amounts of α-hydroxy carboxylic acids and tertiary amines required to dissolve the reactive titanium dioxide are dependent on the structure of these compounds and on the reactivity of the titanium dioxide and can be determined very readily by simple experiment. The dissolution in the aqueous reaction medium of the difficulty soluble titanium dioxide hydrate initially formed in the hydrolytic decomposition is easy to follow. In general, the molar ratio of titanium compound, calculated as titanium dioxide, to acid to base is from 1:1:1 to 1:3:3 and preferably from 1:1:1 to 1:2:2.

The ratio by weight of titanium dioxide (calculated amount) to water is generally from 10:90 to 40:60 and in particular from 15:85 to 30:70. It is advantageous to dilute the resulting aqueous solutions with butanediol-1,4, for example at a ratio of from 1:10 to 1:20, before they are added to the reaction mixture. This substantially avoids splashing of the catalyst solution (due to vigorous evaporation of the water) and precipitation of the catalyst.

If the aqueous solution of the resulting titanium compounds is evaporated to dryness, there are obtained colorless, salt-like solid products which may be redissolved in water or water/butanediol-1,4 mixtures without any substantial loss of catalytic activity.

The term polybutylene terephthalates is intended to include those which are modified with up to 20% molar of other dicarboxylic acids or glycols. Suitable modifying agents are, for example, aliphatic dicarboxylic acids of up to 20 carbon atoms, cycloaliphatic dicarboxylic acids having, in particular, from 4 to 6 carbon atoms in the ring and aromatic dicarboxylic acids having one or two aromatic rings. Examples of suitable dicarboxylic acids are succinic acid, adipic acid, sebacic acid, cyclohexane-1,4-dioic acid, p,p'-sulfonyldiphenyl-dioic acid, p,p'-dicarboxydiphenyl ethane and 2,6- and 2,7-naphthalene dioic acids.

Examples of suitable glycols and modifying agents are, in particular, aliphatic or cycloaliphatic glycols of from 2 to 10 carbon atoms and preferably from 2 to 8 carbon atoms, for example ethylene glycol, propylene glycol, hexamethylene glycol, neopentyl glycol and 1,4-bis-hydroxymethylcyclohexane.

It may be convenient, in order to improve the properties of the material, to cause small amounts, for example from 0.1 to 1% molar, of trifunctional or higher polyfunctional crosslinkers such as trimethylol propane or trimesic acid to be condensed with the polybutylene terephthalates.

The titanium compounds used in the present invention may be used in isolated form, in aqueous solution or, advantageously, in butanediol/water mixtures when added to the polyester-forming starting components. Any water added with the titanium compound is rapidly distilled off under the reaction conditions used and consequently no appreciable saponification of the esters present in the reaction mixture occurs.

The addition of the titanium catalysts may take place either in a single portion, before transesterification, or portionwise at various stages of the reactions involved in the polyester synthesis. The titanium compounds used in the invention catalyze both the transesterification reaction and the polycondensation reaction sufficiently well to make the addition of other catalytically active substances unnecessary.

The manufacture of polybutylene terephthalate using the titanium catalysts of the invention may be carried out batchwise or, preferably, continuously.

The transesterification is generally carried out at atmospheric pressure and at temperatures of from 130° to 240° C. and preferably from 140° to 220° C. It is advisable to allow the transesterification reaction to proceed as rapidly as possible and at minimum temperature in order to avoid the formation of considerable amounts of tetrahydrofuran and water due to cyclization of butanediol. A preferred batchwise method is to add the catalyst solution to the mixture of dimethyl terephthalate and butanediol at a temperature of 140° C. and then to gradually heat the mixture to 220° C. at atmospheric pressure, during which process the methanol eliminated distills off together with the tetrahydrofuran and water formed.

The subsequent polycondensation stage should also be carried out at minimum temperatures in order to reduce the formation of tetrahydrofuran and the thermal degradation of the polycondensate. This polycondensation is generally carried out at temperatures of from 240° to 260° C. and preferably at from 250° to 260° C. and at a pressure of from 760 mm. down to 0.1 mm. of Hg. A preferred batch method consists in the gradual evacuation of the transesterification mixture at from 230° to 240° C. to remove the excess butanediol under mild conditions and in subsequent raising of the temperature to the desired final condensation temperature, i.e. 250°–260° C. Using this or a similar procedure, a rapid polycondensation reaction occurs to give products which may well have relative viscosities of more than 1.45 and in particular of more than 1.53 (as measured on a 0.5% w./w. solution in a 3:2 w./w. phenol/o-dichlorobenzene mixture at 25° C.).

The molar ratio of dimethyl terephthalate to butanediol is generally between 1:1 and 1:2 and preferably between 1:1.2 and 1:1.8. Usually, a minimum molar ratio is selected, as the formation of tetrahydrofuran in the transesterification and polycondensation stages increases considerably with increasing molar ratio.

The amount of titanium compound added is generally from 0.005 to 0.5 and in particular from 0.01 to 0.2% by weight, calculated as titanium dioxide and based on the polybutylene terephthalate obtained.

In the preparation of polybutylene terephthalate by the process of the invention it is possible to incorporate conventional additives such as pigments, e.g. titanium dioxide, antistatic agents, dyes, glass fibers, stabilizers and flameproofing agents before, during or after condensation.

The polybutylene terephthalate material produced by the process of the invention may be converted to chip form or the like and then melted or it may be directly melted to form, say, fibers, filaments, sheeting or injection molded articles. The shaped articles thus obtained show useful properties. In particular, the injection molded articles show high mechanical strength and excellent impact resistance.

The products obtained in the present process are also distinguished by their highly desirable property of virtual lack of color.

The titanium catalysts used in our process are, as stated, obtainable from readily available starting compounds by simple interaction thereof in an economical and convenient manner and in the form of substantially stable aqueous solutions. The color of the catalyst solutions is better than that of commercially produced titanic esters, this being naturally beneficial to the color of the polybutylene terephthalate produced therewith. The formation of titanium-containing deposits in the individual reactors of the polyester plant is distinctly less. The catalytic activity of some of these compounds is superior to that of conventional titanium catalysts. Due to the fact that they are in aqueous solution, they may be readily diluted with butanediol without precipitation occurring, which means that they may be conveniently metered to the reaction mixture without giving rise to technical problems. In the concentration required, they are readily soluble in the reaction mixture itself.

In the following Examples the parts and percentages are by weight.

EXAMPLES

A. General instructions for the manufacture of the titanium catalysts of the invention Tetrabutyl orthotitanate (TBOT) is slowly added dropwise with good stirring to a mixture of α-hydroxy carboxylic acid of the structure stated above, a tertiary aliphatic amine and water at from 40° to 50° C. The reactive titanium dioxide formed intermediately by hydrolysis of the titanate redissolves relatively quickly, whilst the eliminated butanol separates in a substantially undissolved form. On completion of the reaction, the upper organic layer is separated from the lower aqueous phase in a separating funnel. The organic phase, which is discarded, contains the major portion of butanol and also colored impurities derived from the titanate, but it contains only traces of unreacted tetrabutyl orthotitanate. The colorless aqueous phase containing virtually all of the titanium added may be diluted with butanediol and used for the polyester synthesis without further treatment. (Cf. Table 1 below).

B. Preparation of polybutylene terephthalate by the process of the invention 1,940 parts (10 moles) of dimethyl terephthalate and 1,350 parts (15 moles) of butanediol-1,4 are melted in a stainless steel vessel under an atmosphere of nitrogen at 140° C., and a quantity of titanium catalyst (dissolved in a 1:10 water/butanediol-1,4 mixture), as listed in Table 2 below, is slowly added with stirring. The transesterification mixture is stirred and heated to 230° C. over from 2 to 3 hours, during which period methanol distills off and eventually small quantities of tetrahydrofuran and water also distil off. On completion of the transesterification, a further amount of catalyst solution, as given below, is added to the reaction mixture with stirring, and the mixture is heated to 240° C. at atmospheric pressure. The polyester melt is then maintained at this temperature and evacuated from 760 mm. to less than 1 mm. of Hg over 1 hour and is subsequently heated from 240° to 250° C. over 1 hour and finally held at 250° C. for 1 hour to complete the condensation.

The finished polycondensate is extruded under nitrogen, quenched in a water bath, granulated and dried.

Table 2 below lists the amount of catalyst added in each case and also gives the relative viscosity, the melting point and the reflectance of the polybutylene terephthalate material produced. The catalyst concentration is given in terms of $TiO_2$ and is based on the amount of dimethyl terephthalate used. The relative viscosity is measured on a 0.5% solution in a 3:2 phenol/o-dichlorobenzene mixture at 25° C. using an Ubbelohde viscosimeter, and the melting point is determined by means of a polarizing microscope. The reflectance R given as a measure of the colorimetric quality of the product is determined on injection molded discs using a reflectance photometer Elrepho (461 mμ filter, MgO standard) by Zeiss. (Cf. Table 2.)

The higher relative viscosity and better colorimetric quality of the polyester specimens produced using the catalyst types II to VIII of the invention as compared with the polyester produced using tetra-n-butyl orthotitanate (catalyst I) may readily be seen from the following Tables.

TABLE 1

| Catalyst type | TBOT [parts (moles)] | Reactants α-Hydroxy carboxylic acid [parts (moles)] | tert. Amine [parts (moles)] | Water [parts] |
|---|---|---|---|---|
| II | 340 (1) | 152 glycolic acid (2) | 202 triethylamine (2) | 515 |
| III | 340 (1) | 76 glycolic acid (1) | 101 triethylamine (1) | 257 |
| IV | 340 (1) | 268 malic acid (2) | 202 triethylamine (2) | 400 |
| V | 340 (1) | 300 tartaric acid (2) | 202 triethylamine (2) | 400 |
| VI | 340 (1) | 192 citric acid (1) | 101 triethylamine (1) | 200 |
| VII | 340 (1) | 152 glycolic acid (2) | 118 trimethylamine (2) | 515 |
| VIII | 340 (1) | 152 glycolic acid (2) | 370 tributylamine (2) | 515 |

TABLE 2

| Catalyst type | Addition of titanium compound (calculated as percent $TiO_2$ based on DMT), transesterification [percent] | | Relative viscosity of polyester | M.P. of polyester [° C.] | Reflectance R [percent] |
|---|---|---|---|---|---|
| | Before | After | | | |
| I (TBOT) | 0.012 | 0.012 | 1.636 | 223 | 70 |
| | 0.012 | 0.036 | 1.726 | 224 | 68 |
| II | 0.012 | 0.012 | 1.682 | 227 | 77 |
| | 0.012 | 0.036 | 1.762 | 226 | 75 |
| III | 0.012 | 0.012 | 1.670 | 226 | 75 |
| IV | 0.012 | 0.012 | 1.702 | 225 | 78 |
| V | 0.012 | 0.012 | 1.776 | 225 | 76 |
| VI | 0.012 | 0.012 | 1.800 | 226 | 76 |
| VII | 0.012 | 0.012 | 1.650 | 225 | 73 |
| VIII | 0.012 | 0.012 | 1.700 | 226 | 72 |

I claim:

1. A process for the manufacture of polybutylene terephthalate containing at least 80% molar of butylene terephthalate units which comprises catalytically transesterifying and polycondensing dimethyl terephthalate and butanediol-1,4 wherein the transesterification and polycondensation catalyst used is a titanium compound which has been prepared by reacting freshly precipitated titanium dioxide with an α-hydroxy carboxylic acid of the general formula:

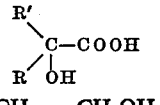

where R is —H, —CH₃, —CH₂OH, —CH₂COOH or $$-\underset{\underset{OH}{|}}{CH}COOH$$

and R' is —H or —CH₂OOH, and a tertiary aliphatic amine having $C_{1-6}$ radicals, in aqueous medium, the molar ratio of titanium dioxide to α-hydroxy carboxylic acid to amine being from 1:1:1 to 1:3:3.

2. A process as claimed in claim 1, wherein the freshly precipiated titanium dioxide is produced by hydrolysis of a titanic acid ester of alcohols having from 1 to 10 carbon atoms.

3. A process as claimed in claim 1, wherein the freshly precipitated titanium dioxide is produced by hydrolysis of tetra-n-butyl orthotitanate.

4. A process as claimed in claim 1, wherein the α-hydroxycarboxylic acid used is glycolic acid.

5. A process as claimed in claim 1, wherein the α-hydroxy carboxylic acid used is malic acid.

6. A process as claimed in claim 1, wherein the α-hydroxy carboxylic acid used is tartaric acid.

7. A process as claimed in claim 1, wherein the α-hydroxy carboxylic acid used is citric acid.

8. A process as claimed in claim 1, wherein the tertiary aliphatic amine used is triethylamine.

9. A process as claimed in claim 1, wherein the titanium compounds prepared in aqueous solution are diluted with butanediol-1,4 before use.

References Cited

UNITED STATES PATENTS 3,463,742   8/1969   Bell et al.
3,644,291   2/1972   Price et al.

MELVIN GOLDSTEIN, Primary Examiner

U.S. Cl. X.R.

260—475 P

UNITED STATES PATENT OFFICE
CERTIFICATE OF CORRECTION

PATENT NO. : 3,817,935
DATED : June 18, 1974
INVENTOR(S) : Ludwig Beer

It is certified that error appears in the above-identified patent and that said Letters Patent are hereby corrected as shown below:

In Column 2, line 39, insert "tetraethyl" after the word "tetramethyl"

In Column 1, after Line 7, insert "Claims priority, application Germany, March 25, 1972, P 22 14 775.7"

Signed and Sealed this twenty-second Day of June 1976

[SEAL]

Attest:

RUTH C. MASON
Attesting Officer

C. MARSHALL DANN
Commissioner of Patents and Trademarks